(12) United States Patent  (10) Patent No.: US 6,725,487 B2
Myrick et al.  (45) Date of Patent: Apr. 27, 2004

(54) PORTABLE RAMP AND LOAD SUPPORT ASSEMBLY

(76) Inventors: Kenneth W. Myrick, 71 Rancho Rd., Carmel Valley, CA (US) 94041; Kenneth Scott Myrick, 5650 Silverado Pl., Paso Robles, CA (US) 93446

( * ) Notice: Subject to any disclaimer, the term of this patent is extended or adjusted under 35 U.S.C. 154(b) by 0 days.

(21) Appl. No.: 10/289,953

(22) Filed: Nov. 6, 2002

(65) Prior Publication Data

US 2003/0213072 A1 Nov. 20, 2003

Related U.S. Application Data

(60) Provisional application No. 60/380,785, filed on May 14, 2002.

(51) Int. Cl.$^7$ .............................. E01D 1/00; A01K 29/00
(52) U.S. Cl. .................... 14/69.5; 119/847; 119/849
(58) Field of Search .................... 14/27, 69.5; 119/847, 119/849; D34/32; 414/537, 921

(56) References Cited

U.S. PATENT DOCUMENTS

| 3,352,440 | A | * | 11/1967 | Wilson | .......................... 414/537 |
| 5,090,335 | A | * | 2/1992 | Russell | .......................... 108/44 |
| D401,731 | S | * | 11/1998 | Jeruss | .......................... D34/32 |
| 5,933,898 | A | * | 8/1999 | Estes et al. | .................... 14/69.5 |
| 6,009,587 | A | * | 1/2000 | Beeman | ........................ 14/69.5 |
| 6,076,215 | A | * | 6/2000 | Blankenship et al. | ......... 14/71.1 |
| 6,119,634 | A | * | 9/2000 | Myrick | ........................ 119/847 |
| 6,185,775 | B1 | * | 2/2001 | McCarthy | .................... 14/69.5 |
| 6,267,082 | B1 | * | 7/2001 | Naragon et al. | ............. 119/849 |
| 6,378,927 | B1 | * | 4/2002 | Parry-Jones et al. | ........... 296/61 |
| 6,379,101 | B1 | * | 4/2002 | Breaux | ........................ 414/537 |
| 6,430,769 | B1 | * | 8/2002 | Allen | .......................... 14/69.5 |
| 6,447,040 | B1 | * | 9/2002 | Young, Sr. | .................... 296/61 |

* cited by examiner

*Primary Examiner*—Gary S. Hartmann
(74) *Attorney, Agent, or Firm*—Burns, Doane, Swecker & Mathis LLP; Claude A. S. Hamrick

(57) ABSTRACT

A portable ramp and load support assembly including a pair of rigid, elongated, first and second ramp components hinged together at adjoining ends by a simple pivot pin. The apparatus is made of light-weight, injection molded plastic material, and is provided with a resilient, non-slip surface on its upper side. The ground-engaging end and vehicle-engaging end are also specially configured to prevent slippage and dislodgment during use. The assembly also includes a plurality of accessory parts including disconnectable legs for allowing the ramp apparatus to be used as a grooming table, examination table, game-cleaning table, etc., and floats, wheels, pull handles and other accessories that can be attached to extend the utility of the apparatus.

27 Claims, 13 Drawing Sheets

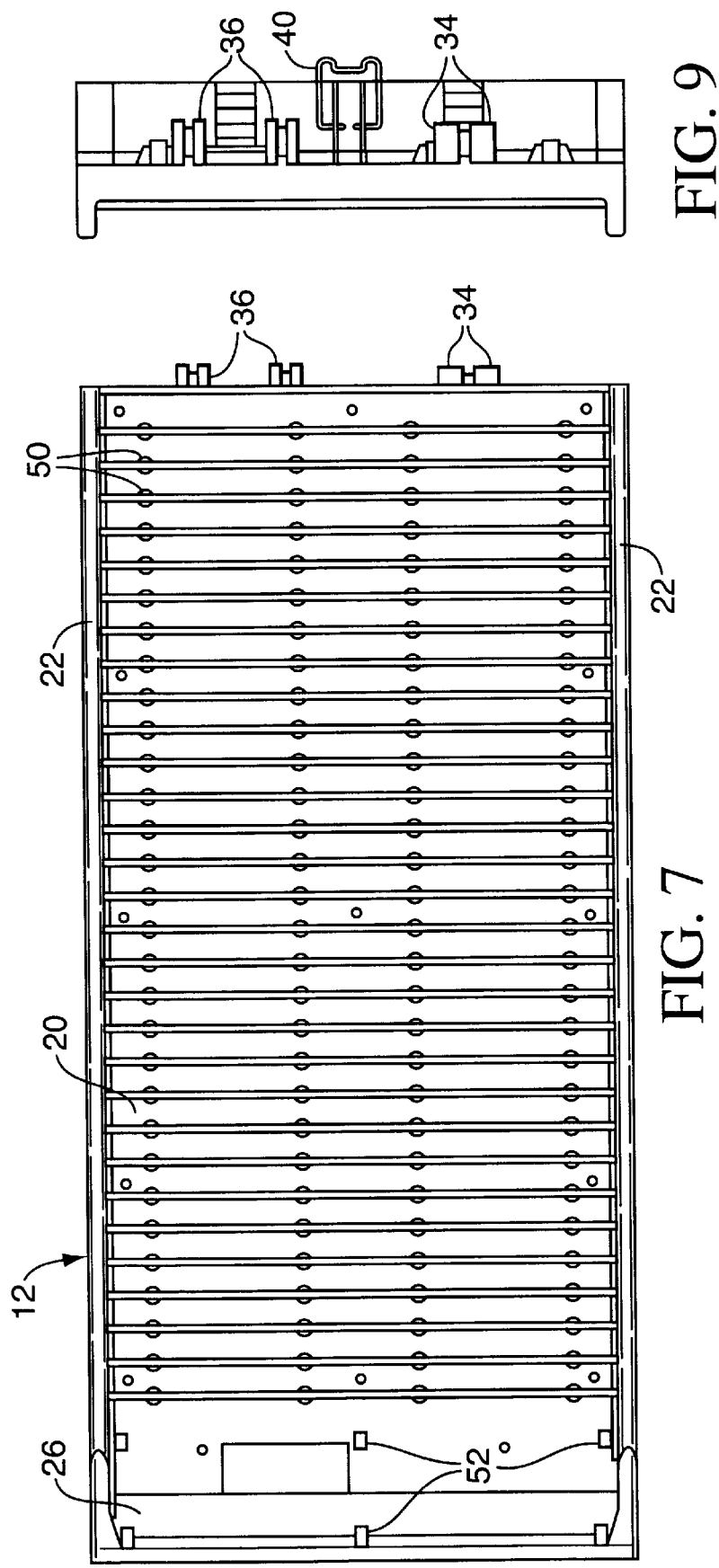

PORTABLE RAMP AND LOAD SUPPORT ASSEMBLY

RELATED APPLICATIONS

This application claims the benefit of U.S. Provisional Application No. 60/380,785, filed May 14, 2002 and entitled RAMP ASSEMBLY AND ASSOCIATED APPARATUS, the entire contents of such application being expressly incorporated herein by reference.

BACKGROUND OF THE INVENTION

The present invention relates generally to devices for enabling an animal or other animate dynamic load to move from one level or surface to another without requiring that it jump or be lifted, and more particularly, to a relatively compact, sturdy, collapsible light-weight portable ramp and load support assembly that can be easily carried in an automotive vehicle, extended and retracted as needed, and positioned to aide the animal in entering into or exiting from the vehicle, or otherwise moving from one surface to another. The assembly also has numerous other load supporting and/or load carrying uses.

Ramps are routinely used to span between vertically spaced, upper and lower surfaces, such as the ground and a relatively elevated top surface of a structure, and thereby provide ease of access to and from the upper surface. Ramps allow a person to slide or move an item along an inclined surface, rather than having to hoist or lift the item between the vertically spaced surfaces. Consequently, ramps are commonly used in construction sites so that materials, machinery and the like are relatively effortlessly raised and lowered between vertically spaced surfaces. Ramps are also often used to by-pass stairs or provide wheelchair access between two vertically spaced surfaces. Moreover, ramps are becoming increasingly popular with pickup truck and van owners as a means to load the bed of the truck with items, such as motorcycles and lawnmowers, with relative ease. Other typical uses for a ramp include providing animal (pet) access to and from a vehicle, and typically include a sturdy support to afford a secure footing over the length of the span.

Traditionally, ramps are secured to an upper surface in a manner that prevents the ramp from disconnecting from the upper surface and falling to the lower surface. For example, the upper end of the ramp may be permanently affixed to the upper surface by mechanical fasteners. However, in many instances, the ramp must be removable so that it may be conveniently stowed once access to or from the upper surface is no longer needed. Additionally, it is often important that the ramp be highly portable so that it may be manually maneuvered, installed and removed. Moreover, where the ramp is to be used to permit ease of access to and from the tailgate of a pickup or floor of a van, the means used to afford attachment thereto must achieve this result without alteration or damage to the surface of the vehicle.

Sport utility vehicles (SUV's), pick-up trucks, station wagons, recreational vehicles and various other automotive vehicles are often high off the ground, and as a result ingress and egress of pets relative to the vehicle can become a significant problem. In order to transport the animals in such vehicles, it is necessary that the animal either jump or be lifted onto the bed of the vehicle, which is sometimes as much as 2 to 3 feet or more above the ground. When the dog is young and vigorous, it is usually capable of simply jumping into the vehicle. However, as the dog ages, it becomes less able and/or willing to jump into the vehicle and must be assisted, often by lifting, in order to raise it from the ground to the vehicle's floor or transport surface. The lifting of any large animal creates a potential for injury to both animal and lifter, and should be avoided where possible. This is particularly true for dogs having hip dysplasia or arthritis, those that are pregnant or recovering from surgery, and those that have long backs and should not be jumping downwardly, e.g., basset hounds or dachshunds. It is also important that "show dogs" be protected from possible injury from jumping into or out of a vehicle. Similar access problems also exist with respect to boats, travel crates, grooming tables, beds, etc.

There is thus a need for a ruggedly-built, foldable ramp assembly that is ideally suited for use with a wide variety of vehicles and which also has other utility.

SUMMARY OF THE INVENTION

It is therefore a principle objective of the present invention to provide a portable light-weight ramp assembly that can be readily folded for transport and storage.

Another object of the invention is to provide an apparatus of the type described which is made of long-lasting, easily cleanable molded plastic material.

Still another object of the present invention is to provide an apparatus of the type described which is easily assembled without the use of any tools.

Still another object of the present invention is to provide an apparatus of the type described having a non-slip upper surface so as to prevent accidental injury to animals using same.

Yet another object of the present invention is to provide an apparatus of the type described which is adapted for other uses such as transport cart, grooming table, means for providing pet access to boat or dock from water, etc.

Briefly, a presently preferred embodiment of the present invention includes a pair of rigid, elongated, first and second ramp components hinged together at adjoining ends by a simple pivot pin. The apparatus is made of light-weight, injection molded plastic material, and is provided with a resilient, non-slip surface on its upper side. The ground-engaging end and vehicle-engaging end are also specially configured to prevent slippage and dislodgment during use. The assembly also includes a plurality of accessory parts that enable the ramp to have utility in applications other than its use as a ramp.

An important advantage of the present invention is that it provides a sturdy, light-weight, long-lasting and easily cleanable ramp apparatus suitable for use by dog and other large animal owners with SUVs, pickups, RV's and station wagons. The apparatus also includes disconnectable legs for allowing the ramp apparatus to be used as a grooming table, examination table, game-cleaning table etc. Furthermore, floats, wheels, pull handles and other accessories can be attached to extend the utility of the apparatus.

These and other objects and advantages of the present invention will no doubt become apparent to those skilled in the art after having read the following detailed description of a preferred embodiment illustrated in several figures of the drawing.

BRIEF DESCRIPTION OF THE DRAWING

FIG. 7 and is a top plan view of the upper component part of the ramp shown in FIG. 1;

FIG. 8 is a side view of the component part shown in FIG. 7;

FIG. 9 is an end view of the upper component part shown in FIG. 7;

DETAILED IN DESCRIPTION OF THE PREFERRED EMBODIMENT

Figure 1:
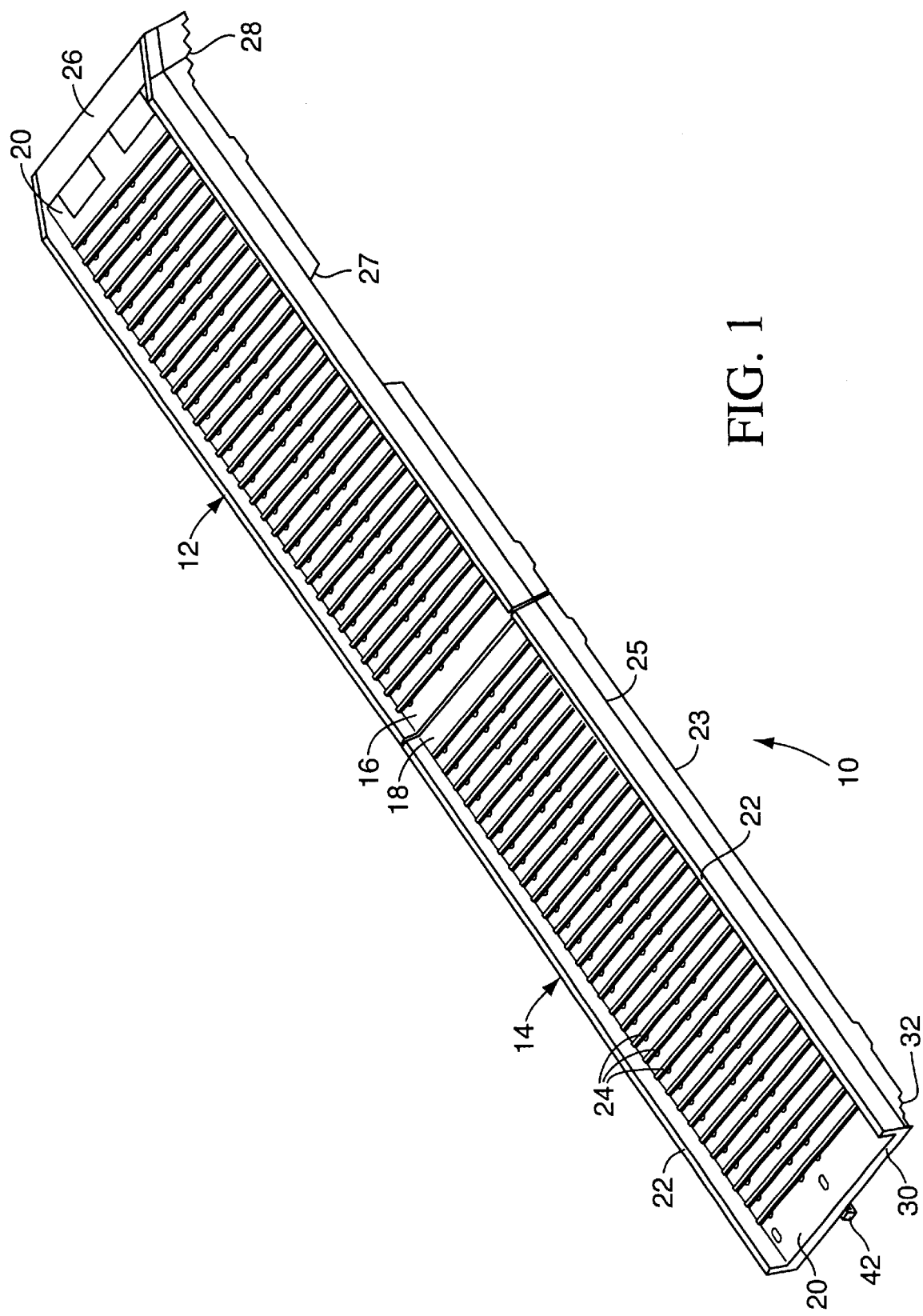
FIG. 1 is a perspective view showing a ramp in accordance with the present invention in its extended configuration.

Referring now to FIG. 1 of the drawing, a ramp device in accordance with the present invention is illustrated at 10 and shown in its extended configuration. The ramp is comprised of upper and lower component parts 12 and 14 connected together at their adjoining ends 16 and 18. The parts 12 and 14 are preferably injected molded plastic parts made of a relatively light-weight plastic material. The parts have a generally planar upper surface 20 forming tread portions bounded on each side by upstanding longitudinally extending side rails 22 having double wall thickness to add stiffness to the ramp parts. In the preferred embodiment, upper surface 20 is provided with a multiplicity of transversely extending parallel ribs 24 of approximately 5/16 inch width and 1/8 inch height and made of an injection molded resilient material (rubber, plastic or the like) that forms a non-skid surface for the ramp.

The lower and outer extremities of the side rails 22 are of a single thickness and form downturned skirts 23 more clearly depicted in other figures described below. The outer surfaces of the side rails and skirts form the lateral or side surfaces 25 of the ramp. Note that a cutout 27 is provided in at least one of the skirts 23 to facilitate carriage, as will also be further described below.

The upper end portion 28 of the ramp is turned downwardly from the plane tread portion 20 so as to provide a short section having an upper surface 26 that angularly intersects the upper surface of tread portion 20 at an angle corresponding to the nominally intended slope angle to which the ramp is designed, i.e., the approximate angle that the ramp makes with the ground when it is in use at the back of a vehicle. The bottom edges of the sides of end portion 28 are stepped and have a flexible member (not shown) attached thereto forming a non-skid surface, as will be further described below. The lower end portion 30 of the ramp is not turned but instead has the lower extremity of its side skirts beveled and stepped, as illustrated at 32, to engage a ground or other supporting surface. As will be further described below, a nonskid material may also be affixed thereto to prevent slipping.

Figure 2:
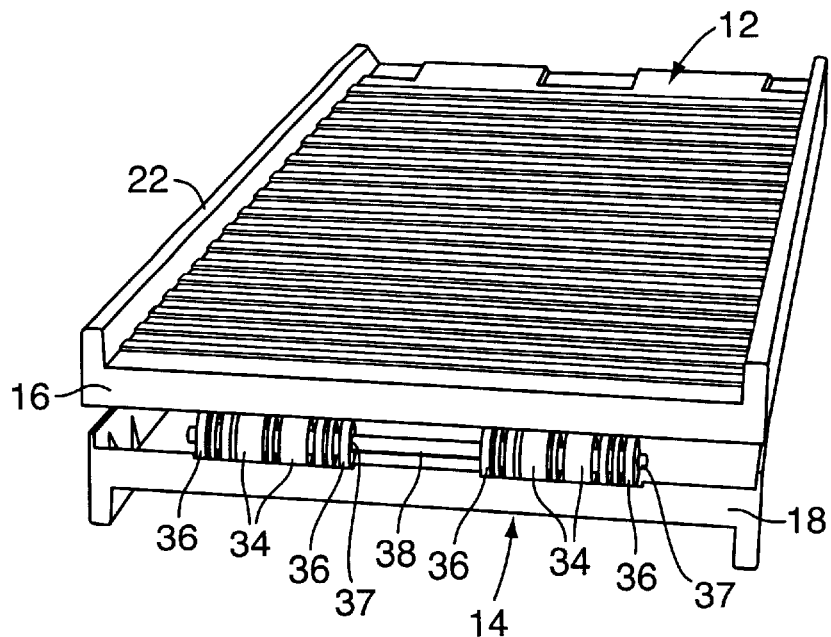
FIG. 2 is a perspective view showing the ramp of FIG. 1 in its folded or retracted configuration.

Turning now to FIG. 2, the ramp of FIG. 1 is shown in perspective in its retracted or folded configuration with the upper part 12 rotated into parallel relationship with the lower part 14. As visible in this view, the end portions 16 and 18 are provided with apertured projecting flanges forming interior and exterior hinge parts 34 and 36. It will be noted that the upper part 12 includes both an inner hinge part 34 and a complimentary outer hinge part 36, as does the lower part 14. The two configurations of hinge parts form a hinge set that is positioned on upper ramp part 12 so as to interdigitate and mate together with their compliments on the lower ramp part 14. The hinge parts 34 and 36 include transversely extending cylindrical apertures or openings 37 adapted to receive a hinge pin 38 about which the ramp assembly is rotatable. As an alternative, the hinge parts and pin means could be formed as integral parts of the ramp components adapted to snap together during assembly.

Figure 3:
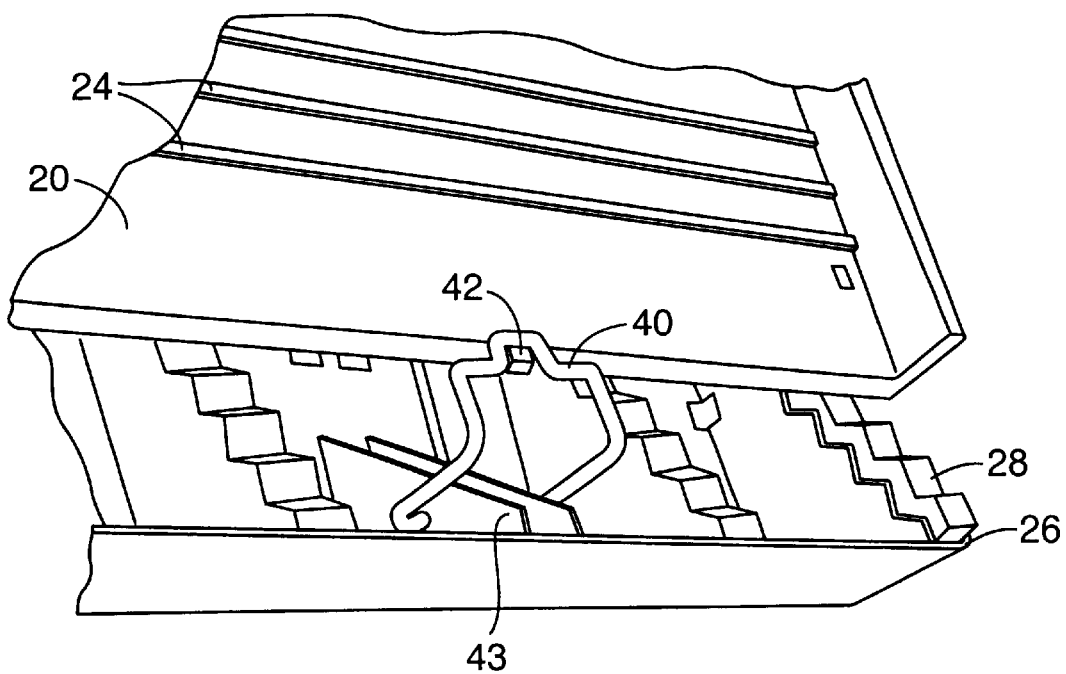
FIG. 3 is a broken partial perspective view showing the latching mechanism used to hold the components of the ramp of FIG. 1 in the folded configuration of FIG. 2.

FIG. 3 illustrates in broken perspective, as viewed from beneath, the end of the folded ramp assembly opposite to that shown in FIG. 2. Specifically, the end portion 20 of the lower part 14 is shown in front of (above) the end portion 26 of the upper part 12. A latch mechanism 40 is also shown pivotally engaged to a stiffening web 43 formed in the end portion 26. As depicted, the latch 40 is shown in locking engagement with a tang or keeper 42 formed as a molded part of the lower ramp component 14. With the latch in the illustrated "latched" configuration, the upper and lower parts will be held together for transport and storage.

Figure 6:
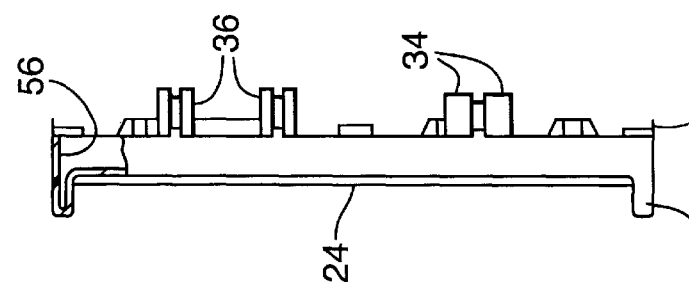
FIG. 6 is an end view of the compote part shown in FIG. 4.

Referring now to FIGS. 4–9, further details of the molded component parts 12 and 14 will be explained. As previously indicated, the injection molded parts 12 and 14 include a planar body or web forming a tread portion 20 having an upper surface provided with laterally extending ribs 24 that form the tread surface of ramp. This surface is bounded on its sides by the side rails 22, the outer surfaces of which combine with the downwardly extending skirts 23 to form the outer side walls of the ramp components. As may be noted, particularly in FIG. 5 which includes a cutaway section, the tread portion 20 is formed by a molded web 21 of single thickness. Furthermore, as depicted in FIG. 6, the side rails 22 are formed as upturned and then downturned extensions of the lateral edges of the web 21, and the skirts 23 are further extensions of the downturned side rail portions formed beneath the mold parting line.

Figure 4:
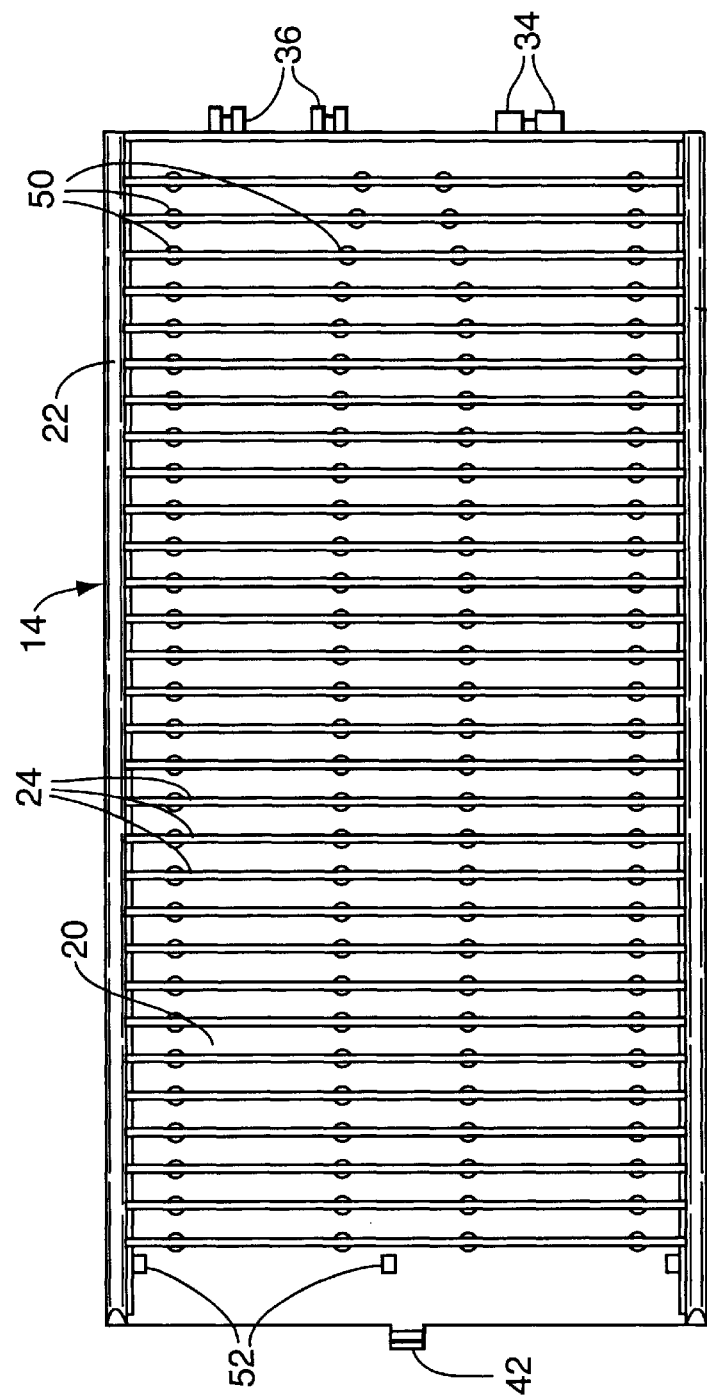
FIG. 4 is a top plan view of the lower component part of the embodiment of FIG. 1.
Figure 5:
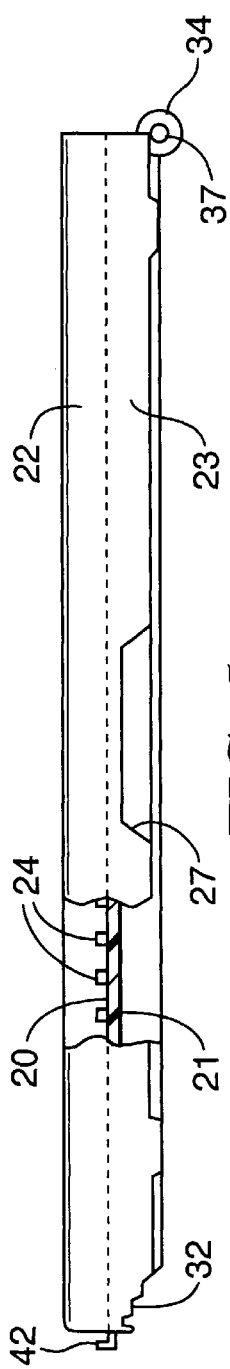
FIG. 5 is a side view of the lower component part shown in FIG. 4.

Affixed to the upper portion 20, as previously described, are the transversely extending ribs 24 that are molded to the upper surface of web 21. In accordance with the present invention, the rib molding function is performed as a secondary molding step in which a lower material feeding mold (not shown) is placed beneath the web 21, and an upper, tread mold (not shown) is placed above the surface 20. Note that, as indicated in FIGS. 4 and 7, a plurality of openings 50 have been previously molded into the web 21. In order to form the ribs 24, the material feeding mold including four open, longitudinally extending channels (not shown) is engaged to the bottom of web 21 with its channels aligned with the openings 50, and the second mold part (not shown) having a plurality of transversely extending regularly spaced apart grooves formed therein is placed against the upper surface 20. By injecting molten rubber or similar material into the channels of the lower mold part and causing it to pass through the web holes 50 into the grooves of the upper mold part, the tread ribs 24 will be formed. Note also in FIGS. 4 and 7 that several rectangular openings 52 are also molded into the web 21 in the upper and lower end portions of the ramp assembly to accommodate attachment of various accessories which will be described in further detail below. Also better shown in these FIGS. 8 and 9 is the configuration of the hinge parts 34 and 36 and their hinge pin openings 37.

Figure 10:
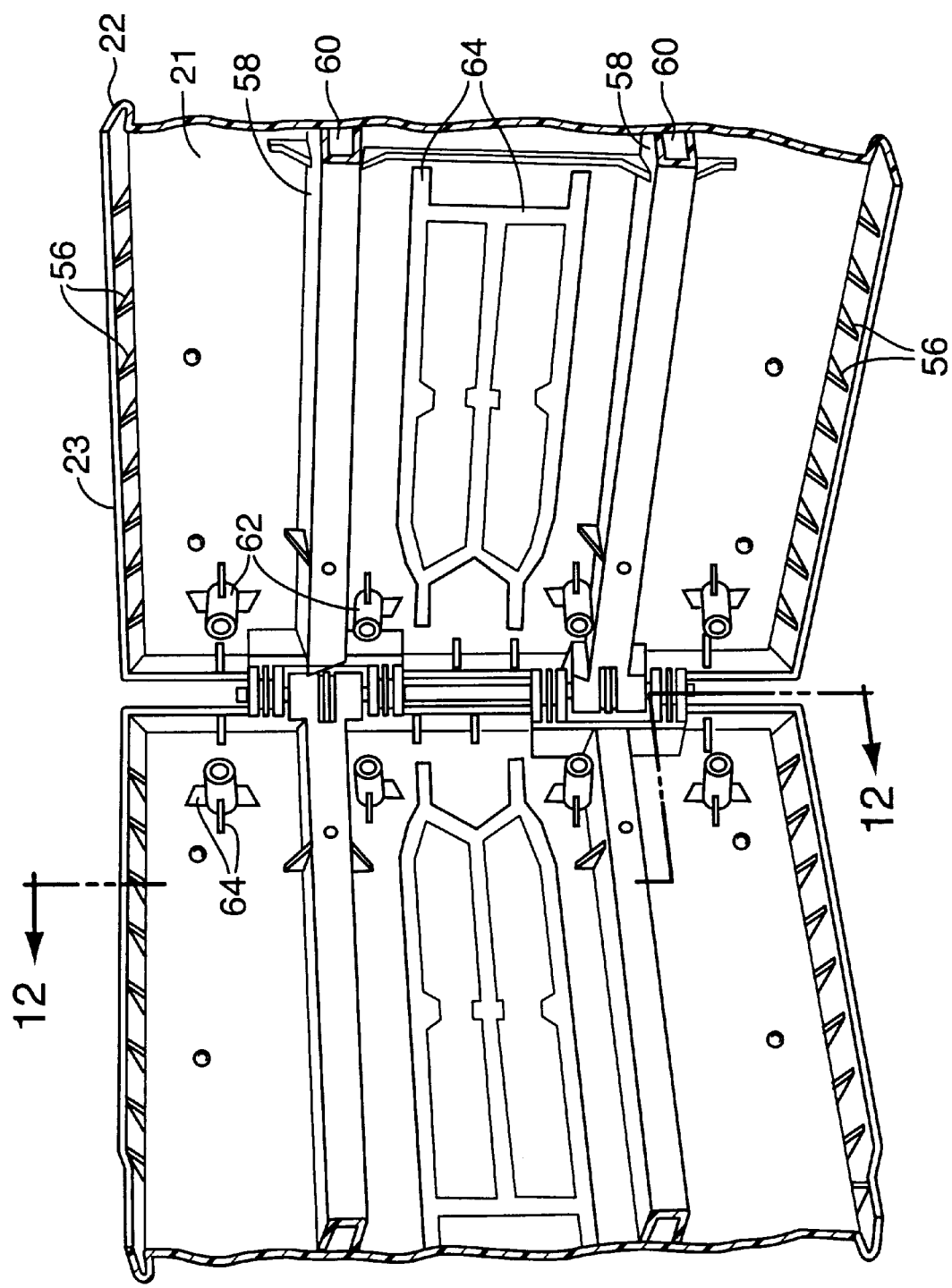
FIG. 10 is a broken partial perspective view showing the component part juncture from the bottom.
Figure 11:
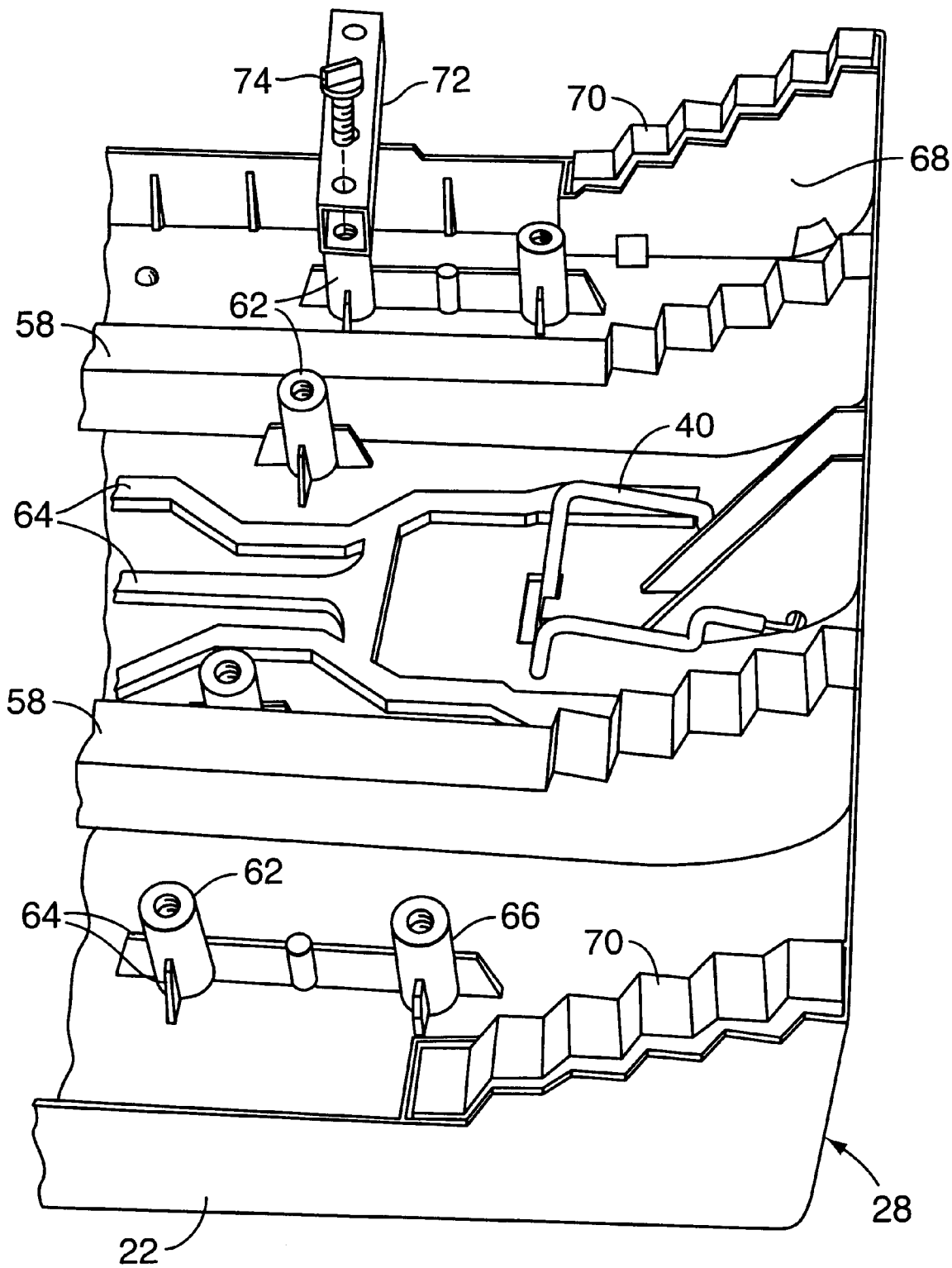
FIG. 11 is a broken partial perspective view showing details of the bottom of the upper component part of the ramp of FIG. 1.
Figure 12:
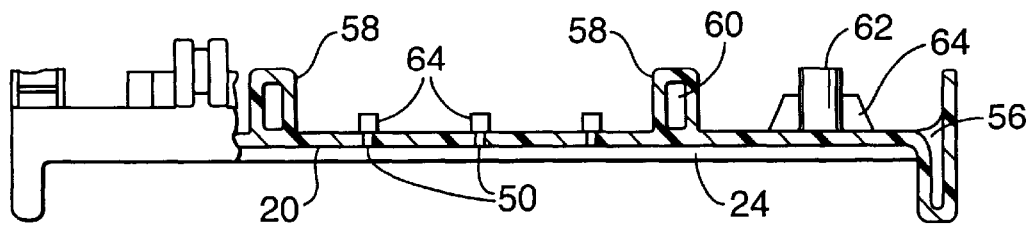
FIG. 12 is a partially broken end view and cross section taken along the line 12—12 in FIG. 11.

Turning now to FIGS. 10–12, various details of the bottom sides of the ramp parts 12 and 14 are illustrated. As shown in these figures, the structure of the side rails 22 and skirts 23 can be easily understood. As was illustrated in FIG. 6, and perhaps more clearly shown in FIG. 12, the lateral extremities of the web 21 are in effect folded up to form the inner wall of the side rails 22 and then folded back down to form the outer side walls of the side rails 22 and then down to form the side surfaces and skirts 23. Small stiffening webs 56 (FIG. 12) are also formed in spaced apart locations along the length of the ramp parts. These webs help maintain planarity of the side wall and add to the rigidity to the structure.

Also illustrated in these figures are a pair of longitudinally extending structural, channel shaped, load support members 58. Note that these box beam members are hollow and enclose a chamber 60 that extends along the length of the ramp part. The chamber 60 is formed during the first mold operation by injecting nitrogen gas into the channel during or following injection of material into the mold so as to blow out the softer and more fluid material at the center of the chamber as the injected material at the outer sides of the chamber adhere to the mold surfaces and begin to cool and set up. The gas ingress and egress openings are subsequently closed to hermetically seal the chamber 60. This makes for a very strong and rigid ramp structure and conserves weight and plastic material.

Proximate the pivot ends of each ramp part, four cylindrical standoffs are molded to the bottom surface of web 21. Proximate the remote ends of each ramp part six cylindrical standoffs are molded to the bottom surface of web 21. Each of these standoffs is provided with a coaxial bore that may include internal threads extending along the length thereof. Each of the standoffs is also provided with four external strengthening webs or flanges 64. The standoffs provide a means by which various accessories can be fastened or affixed to the bottom of the ramp, as will be described in more detail below. Note also in these figures that the vestiges of the tread rubber molding operation are shown at 64. These rubber ribs form no function and are merely the residue of the molten rubber material that was injected through the bottom mold to pass through openings in the web 21 to cooperate with the upper mold part and form the tread ribs 24 (not shown). Also shown in FIG. 11 are additional strengthening webs 68 formed at the remote ends in-board of each side of the ramp ends 28 and 32. In addition to their stiffening function these webs also cooperate with the outer skirts 22 to form pockets for receiving rubber, nonskid pads 70. Additionally shown in FIG. 11 is an attachment block 72 that may be secured to one or more of the standoffs 62 by means of bolts or screws 74 for any of various purposes described below.

Figure 13:
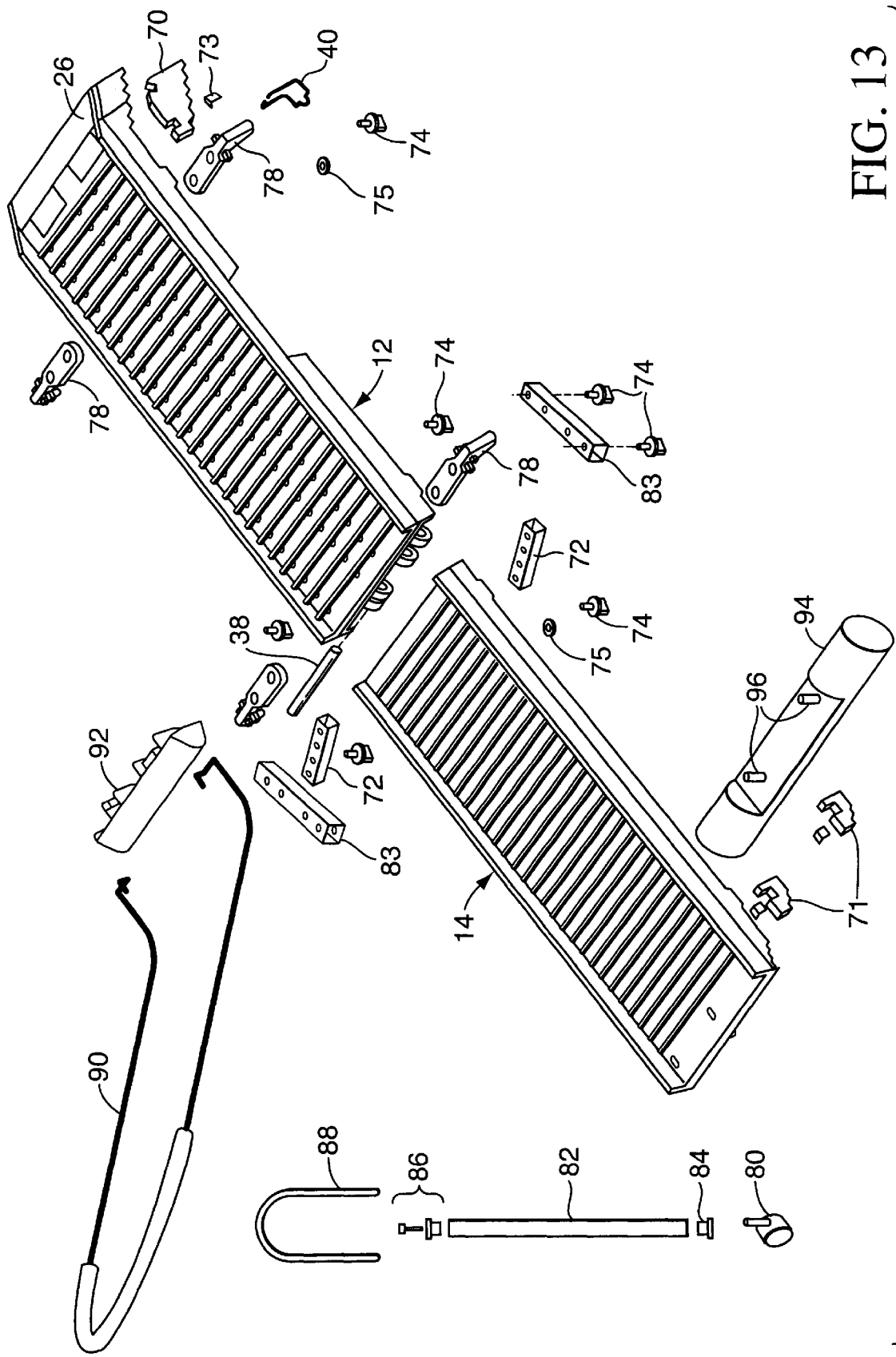
FIG. 13 is an exploded perspective view illustrating the several component parts, accessories and fixtures included in the present invention.

In FIG. 13 of the drawing, an exploded view of the ramp assembly together with various parts and accessories is illustrated. Such parts may include the pivot shaft 38, the end latch 40, non-skid pads 70 and 71, clips 73 for holding the pads 70 in place, the brackets 72 and associated screws 74 and washers 75, the strengthening bars 83, a plurality of L-shaped brackets 78 used to attach wheels 80 and legs 82 to the ramp parts, associated footpads 84 and attachment hardware 86, a pet cage hold down 88, a pull handle 90, and an end cap 92. Also included as an accessory is a float or float assembly 94 having tabs or clips 96 that engage the standoffs 62. Using a single float one end of the ramp can be supported in a body of water so that the ramp can be used by pets or humans as a means of ingress/egress to a pool, dock or boat. Using at least one other float, and perhaps as many as four, i.e., one at each a floating platform can be provided. A gangway spanning between two surfaces moving up and down relative to each other can also be provided using a single float at each end. Such application is useful as a means for moving between a dock and a boat deck for example without scarring the finish on the boat deck surface.

Figure 14:
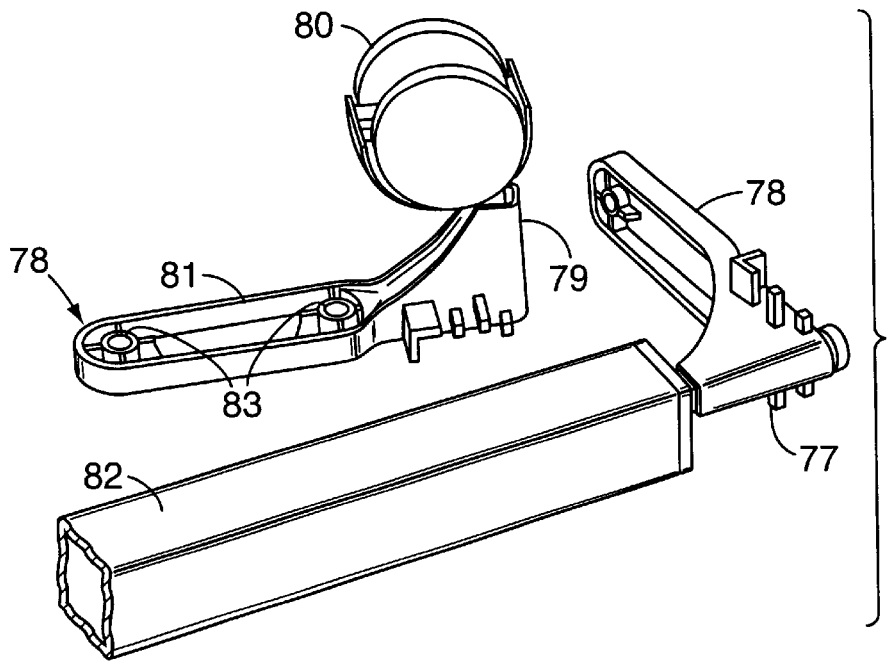
FIG. 14 is a perspective view illustrating details of the attachment brackets used to affix legs and/or wheels to the ramp parts of FIG. 1.

In FIG. 14 the L-shaped brackets 78 are shown in more detail and include a normally vertically oriented base portion 77 having a threaded bore formed therein at 79, and a normally laterally extending attachment flange portion 81 having a pair or screw/bolt holes 83. Extending from the sides of base portion 77 are a plurality of fingers and angles that provide a means by which the deformed ends of the handle 90 may be snappingly engaged to affix the handle to the ramp. Alternative handle attachment means could also be used. Also shown in FIG. 14 is a swivel wheel 80 and a tubular leg 82 that may be attached to the ramp by means of the brackets 78.

Figure 15:
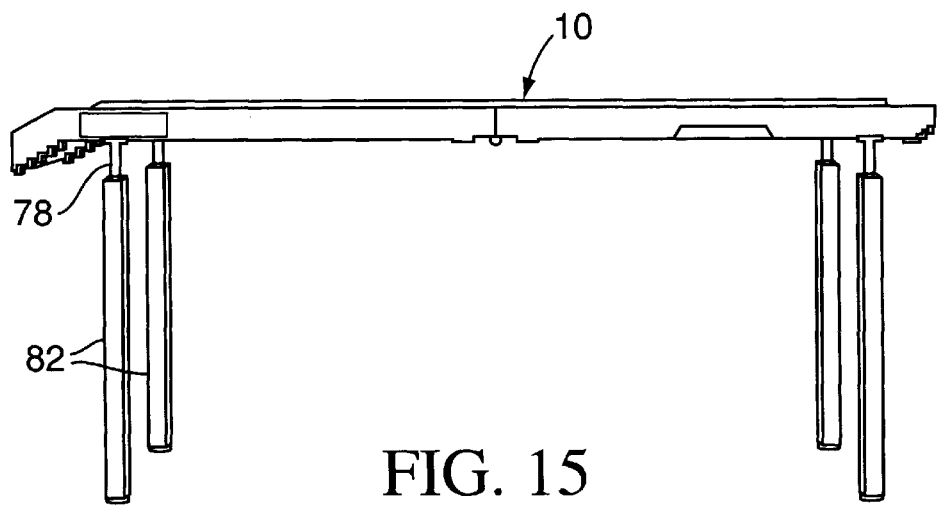
FIG. 15 is a perspective view showing the ramp of FIG. 1 configured as a table.
Figure 16:
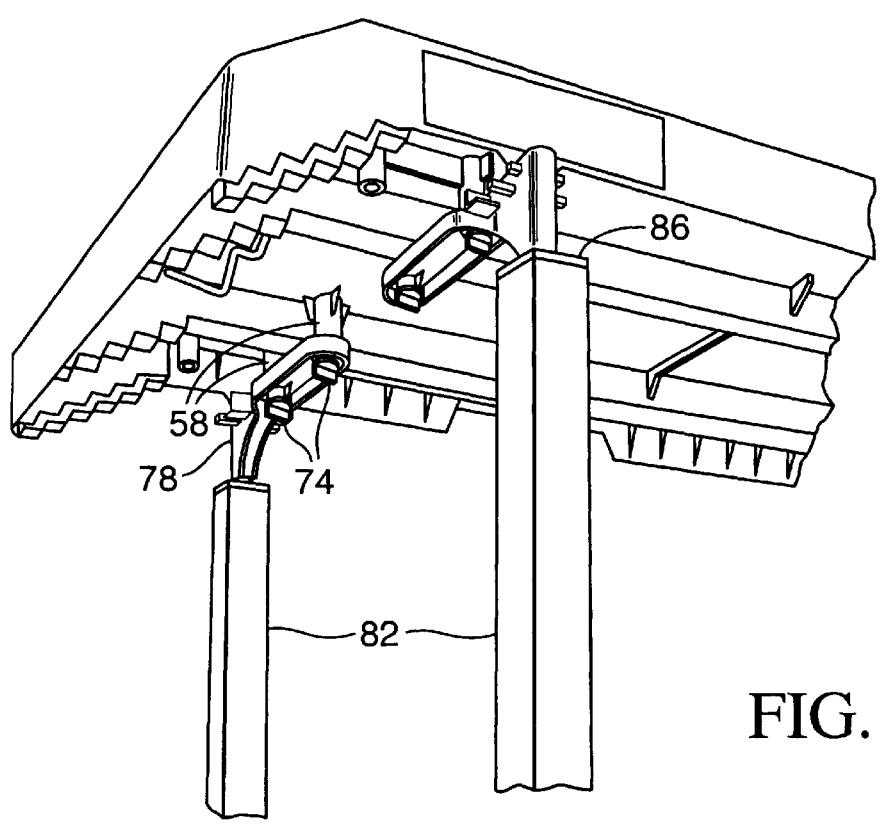
FIG. 16 is a broken partial perspective view illustrating leg attachment to the table of FIG. 15.

In FIGS. 15 and 16, an extended ramp assembly 10 is shown configured as a table by attaching four brackets 78 to the standoffs 58 using screws 74, and in turn affixing four legs 82 to the brackets using the attachment hardware 86. With the assembly so configured, a table is provided that can easily be used as a grooming table, a fish cleaning table, an eating table, etc.

Figure 17:
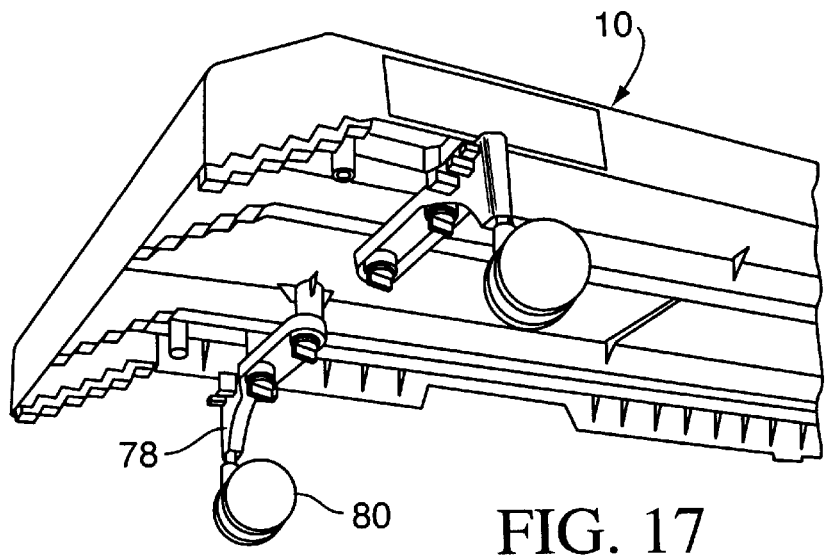
FIG. 17 is a broken perspective view showing attachment of wheels to the bottom of one end of the ramp of FIG. 1.
Figure 18:
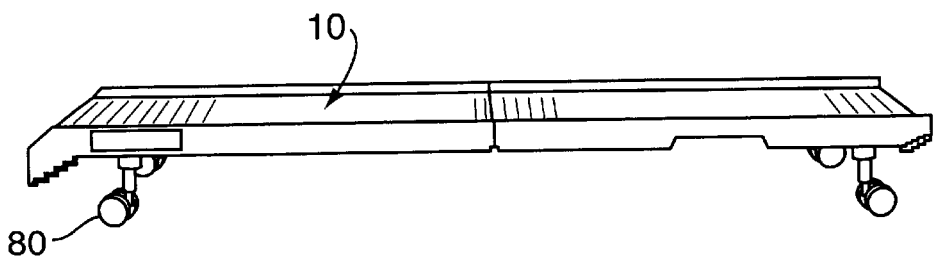
FIG. 18 is a perspective view illustrating the ramp of FIG. 1 with wheels attached thereto.

As depicted in FIGS. 17 and 18 a wheelable platform may be provided by attaching wheels 80 either directly to the brackets 78, in whhch case a low level platform is provided, or the wheels could be affixed to legs attached to the ramp assembly in which case a wheeable table (not shown) can be provided.

Figure 19:
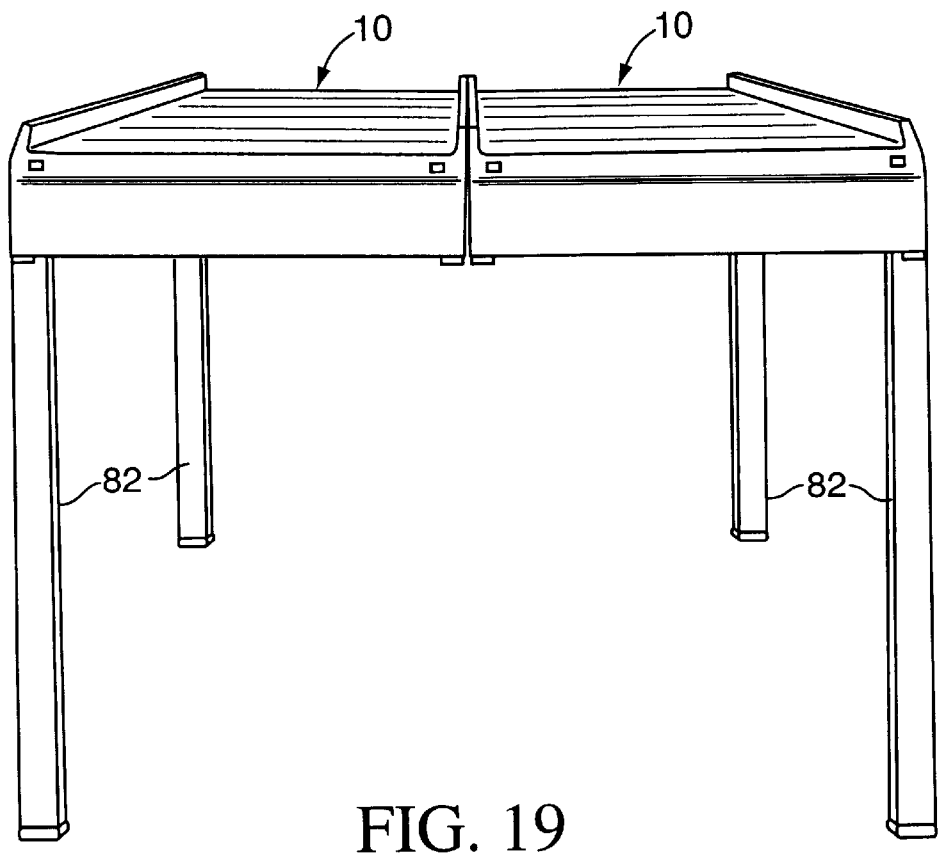
FIG. 19 is a perspective view illustrating a table embodiment incorporating two of the ramp of FIG. 1.
Figure 20A:
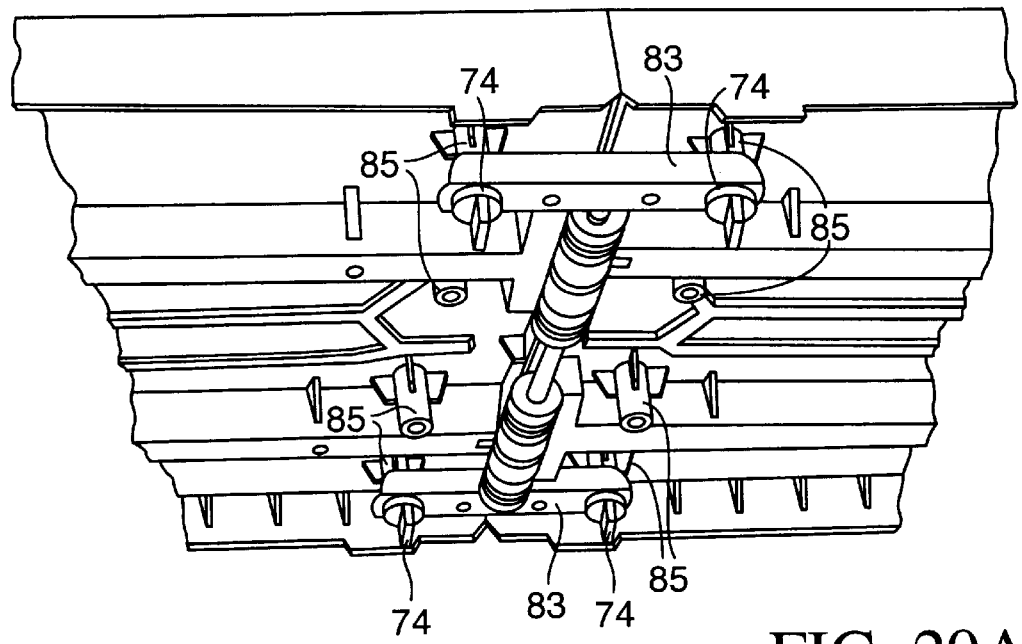
FIG. 20A is a broken perspective view showing installation of strengthening bars to the bottom of a ramp in accordance with the present invention.
Figure 20:
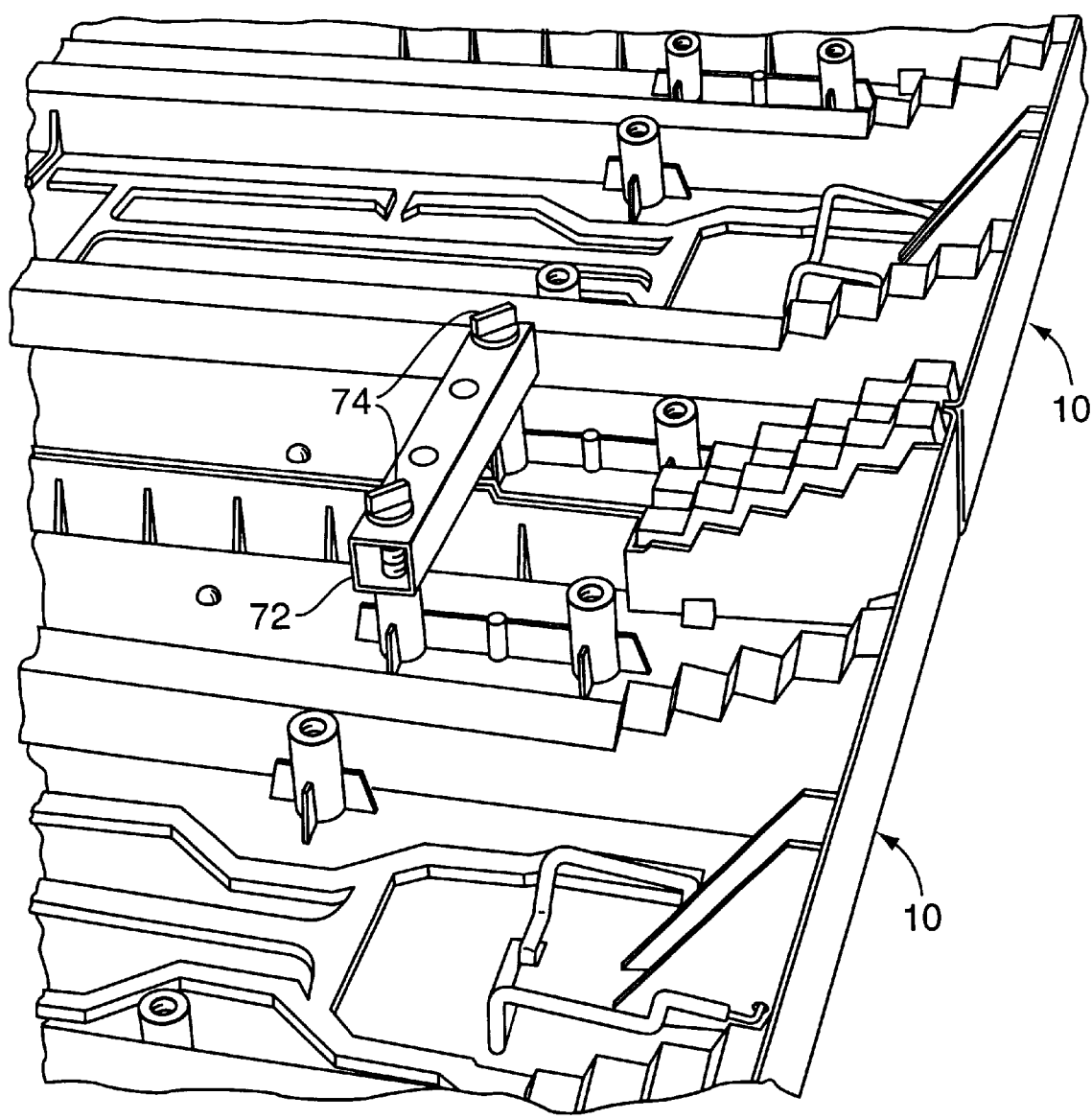
FIG. 20 is a broken perspective view showing details of the bottom and illustrating attachment of the ramp of FIG. 19.

A double wide table can also be provided as depicted in FIGS. 19, 20 and 20A by joining two ramp assemblies 10 together with brackets 72 and associated screws 74. In this case legs are only attached to the outer sides of each ramp assembly as shown in FIG. 19. However, if a heavy load is to be carried by the double wide table, it will be appreciated that additional legs may be attached as necessary to support the load.

The ramp can also be used for heavier than normal loads by adding strengthening bars 83 to the bottom. The bars 83 are attached in bridging fashion across the fold line and to the standoffs 85 by screw fasteners 74.

Although the ramp of the present invention is designed in the first instance to be manually portable and to be used by merely placing the lower end on the ground and the upper end on a vehicle bumper or door sill when in use, and carrying it in the vehicle when not in use, for some applications it may be more appropriate to provide a semi-permanent mounting and carriage facility that allows the ramp assembly to be transported outside the vehicle in its folded configuration, and then deployed to its extended configuration as needed. A simple trailer hitch mounted assembly for accommodating such need is illustrated in FIGS. 21–24.

Figure 21:
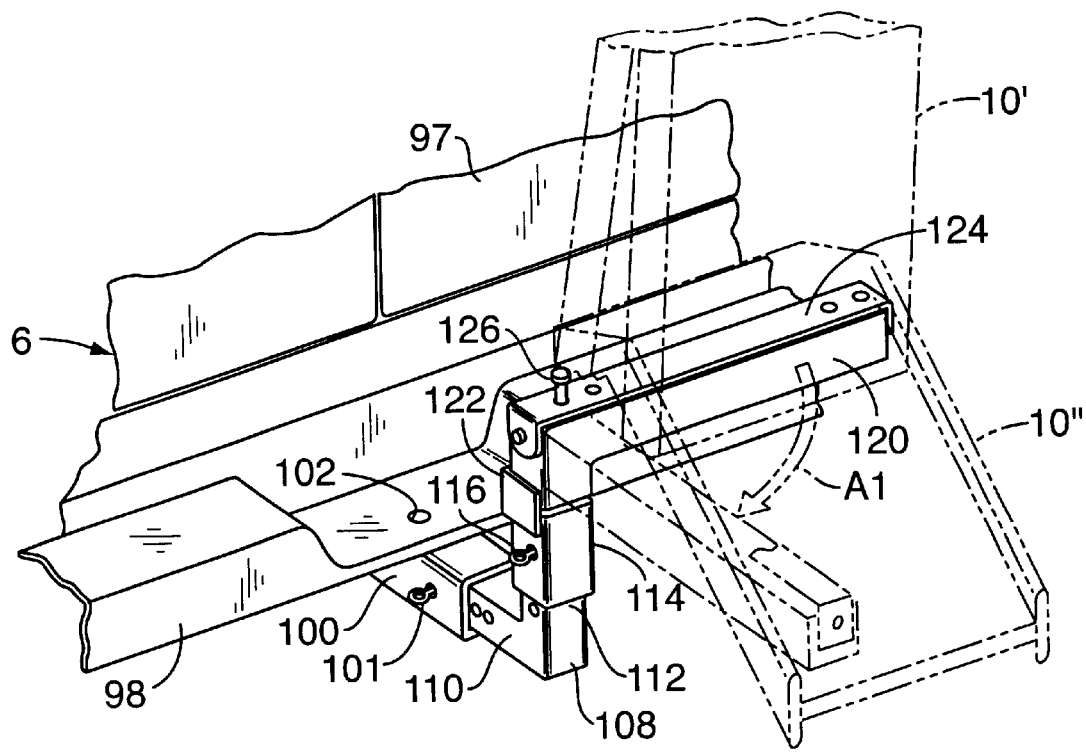
FIG. 21 is a perspective view illustrating a vehicle carriage attachment for the ramp of FIG. 1.
Figure 22:
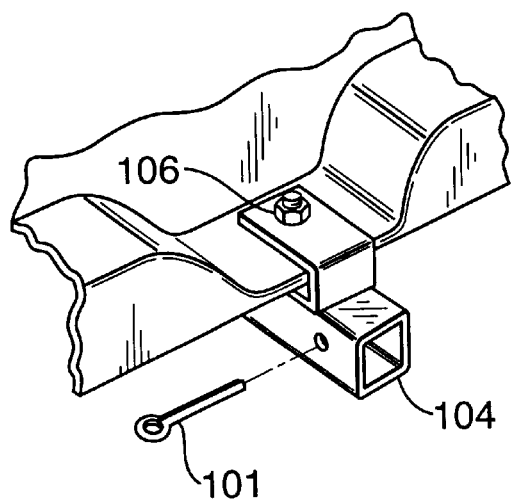
FIG. 22 illustrates a bumper adapter for facilitating use of the carriage attachment of FIG. 21 in accordance with the present invention.

Most modern Sport Utility Vehicles (SUVs) 96 are provided with a trailer hitch assembly as shown in FIG. 21 that extends from the rear of the vehicle beneath the bumper 98 and includes a frame mounted steel tube 100 of rectangular cross section for telecopically receiving a mating steel tube having an appropriately sized ball hitch secured thereto. A robust pin passing through the telecoped assembly affixes the two parts together. For those vehicles not having such a hitch assembly, a depressed portion of the rear bumper is usually provided with an aperature 102 for receiving a lighter duty hitch ball. For such configurations and to accommodate the embodiment of the present invention to be disclosed below, an adapter 104 is illustrated in FIG. 22 that can be bolted to the bumper using the aperature and provide an equivalent carriage receptacle.

Figure 23:
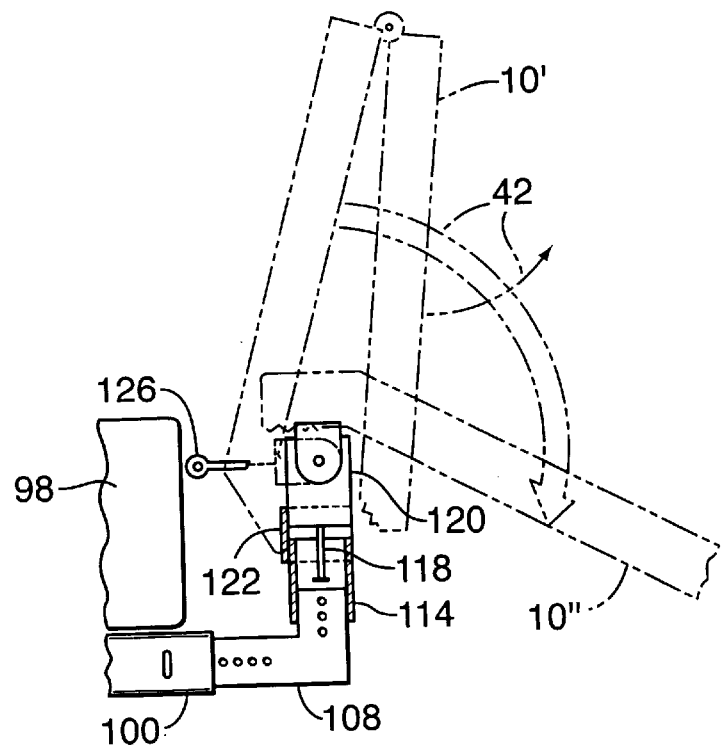
FIG. 23 is a side in view illustrating operation of the carriage attachment of FIG. 21.
Figure 24:
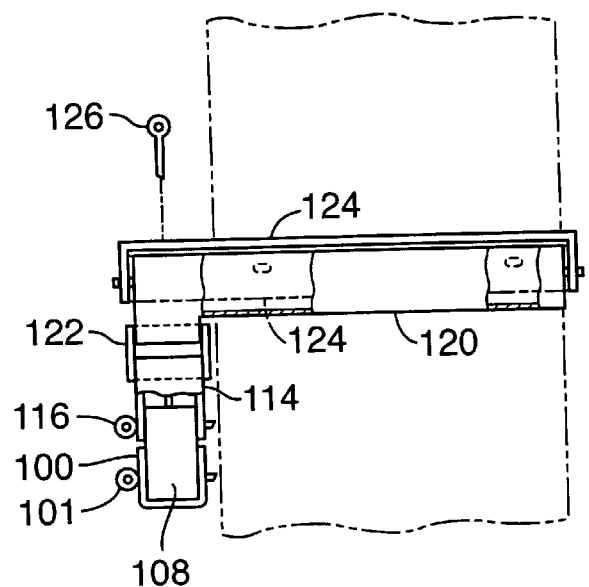
FIG. 24 is a rear elevational view, partially broken to illustrate the carriage attachment of FIG. 21.

As illustrated in perspective in FIG. 21, in side elevation in FIG. 23, and in rear elevation in FIG. 24, an embodiment of the ramp carrier includes an L-shaped support bracket or base 108 having a horizontally extending leg 110 for telecopically mating with the hitch tube 100, and a vertically extending leg 112 serving as a riser for the assembly. The position of leg 110 in tube 100 is maintained by a pin 101 that is passed through bores and holes provided for this purpose. Telecopically received over the leg 112 is a sleeve 114 held in place on leg 112 by a pin 116 that extends through apertures in leg 112 and sleeve 114. The position (height) of the assembly is determined by the choice of bore in leg 112 to receive the pin. Similarly, fore and aft positioning of the assembly relative to the vehicle bumper 98 is determined by choice of pin bore in leg 110.

Pivotally affixed to sleeve 114 by a vertically extending pivot pin 118 is an L-shaped carriage arm 120. Note that pin 118 is slideable up and down in a cap plate welded to and forming a closure for the top of sleeve 114. To prevent unintentional rotation of arm 120 relative to sleeve 114 a metal cuff 122 is welded to the upper part of sleeve 144 and receiveably engagages the downturned segment of arm 120. In order to swing the arm 120 into a rearwardly extending position, as indicated by the arrow A1, for example, to clear the vehicle door, one would simply lift the arm 120 clear of the cuff 122 and swing it about the pin 118 and the drop it back into engagement with the cuff 122. Pivotally mounted to each end to the arm 120 is a ramp support bar having apertures formed therein which align with the standoff apertures in the underside of the upper end of the ramp. The ramp is thus securred to the bar by the same type of screws/bolts used to affix other accessories to the ramp assembly. A pin 126 is passed through an aperture in either one or both ends of bar 124 and through an aperture in arm 120 to lock the ramp in its upright folded configuration as depicted by the dashed lines 10' in FIGS. 21 and 23. Conversely, when it is time to lower the ramp into its extended position, one simply pulls the pin(s) 126 and rotates the ramp into position 10" as suggested by the arrows A2. This is of course only one of many ways that the ramp of the present invention can be affixed to the rear or side of a vehicle.

It will thus be appreciated that the assembly forming the disclosed preferred embodiment of the present invention has substantial utility for a wide variety of applications. For example, the assembly has utility as a ramp, as a bridging "gangway", a table, a platform, a floating platform, a transport platform and any other application which requires a rigid support structure supportable at least at its ends. The assembly is rugged, lightweight, portable, foldable, easy to clean, etc.

The inventors acknowledge with appreciation the contribution that their engineer Te-Hsin Wei made in assisting in the implementation of the invention described above.

Although the present invention has been disclosed herein in terms of certain preferred embodiments, it is contemplated that after having read the above disclosure, numerous alterations, modifications and other uses and applications thereof will no doubt become apparent to those skilled in the art. It is therefore intended that the appended claims be interpreted as covering all such applications, alterations and modifications as fall within the true spirit and scope of the invention.

What is claimed is:

1. A ramp assembly comprising:
    a first molded ramp component including an elongated generally planar first tread portion having its lateral extremities folded up, out and then down to form upstanding side rails and downwardly extending lateral side walls, a first end portion at one end of said first tread portion being configured to engage a first support surface at a first elevation, a second end portion at an opposite end of said first tread portion having a first plurality of apertured flanges extending therefrom to form a first hinge set, and means forming at least one integrally molded box-beam disposed beneath and extending along substantially the entire length of said first tread portion;
    a second molded ramp component including an elongated generally planar second tread portion having its lateral extremities folded up, out and then down to form upstanding side rails and downwardly extending lateral side walls, a first end portion at one end of said second tread portion having a second plurality of apertured flanges extending therefrom to form a second hinge set, a second end portion at an opposite end of said second tread portion being configured to engage a second support surface at a second elevation higher than said first elevation, and means forming at least one integrally molded box-beam disposed beneath and extending along substantially the entire length of said second tread portion; and
    at least one pivot pin adapted to extend through the apertures in said first and second hinge sets so as to pivotally join said first molded ramp component to said second molded ramp component, wherein said first and second molded ramp components may be rotated about said pivot pin between a folded configuration with said first and second molded ramp components lying in parallel side-by-side relationship, and an extended configuration wherein said first and second molded ramp components lie within a common plane such that upon placement of said first end portion on a first surface and placement of said second end portion on a second surface, said assembly forms a ramp along which a pet can walk.

2. A ramp assembly as recited in claim 1 and further comprising means for locking said first and second molded ramp components in at least one of said first and second configurations.

3. A ramp assembly as recited in claim 2 wherein said means for locking includes a keeper affixed to said first end portion of said first molded ramp component and a latch affixed to said second end portion of said second molded ramp component, whereby when said first and second molded ramp components are in said folded configuration, said latch can engage said keeper to lock said components together.

4. A ramp assembly as recited in claim 1 wherein said first end portion of said first molded ramp component is beveled to mate with a first supporting surface when the assembly is in its extended configuration and inclined to extend between supporting surfaces at different elevations.

5. A ramp assembly as recited in claim 4 wherein said second end portion of said second molded ramp component angularly intersects said second tread portion so as to matingly engage a second supporting surface at a higher elevation than the first supporting surface.

6. A ramp assembly as recited in claim 1 wherein said first and second tread portions have non-slip means affixed thereto to improve frictional engagement between a pet's paws and the surfaces of said tread portions.

7. A ramp assembly as recited in claim 6 wherein said non-slip means is provided by ribs of resilient material formed on said tread portions and extending transversally thereacross.

8. A ramp assembly as recited in claim 7 wherein an array of apertures is formed in said tread portions for facilitating the formation of said ribs.

9. A ramp assembly as recited in claim 8 wherein said ribs are formed by placing first molds having a plurality of first channels formed therein and extending along the lengths of said tread portions into engagement with the bottom surfaces of said tread portions, said first channels being placed in registration with said apertures, and by placing second molds having a plurality of second channels formed therein and extending parallel to each other and transverse to the lengths of said tread portions into engagement with the top surfaces of said tread portions, said second channels being placed in registration with said apertures, whereby when a molding fluid is injected into said first molds it flows through said first channels, through said apertures, and along said second channels to form said ribs.

10. A ramp assembly as recited in claim 1 wherein said first end portion of said first molded ramp component is beveled to mate with a first supporting surface when the assembly is in its extended configuration and inclined to extend between supporting surfaces at different elevations.

11. A ramp assembly as recited in claim 10 wherein said second end portion of said second molded ramp component is disposed at an angle relative to the length of said second molded ramp component so as to matingly engage a second supporting surface at a higher elevation than the first supporting surface.

12. A ramp assembly as recited in claim 1 and further including a plurality of standoffs integrally formed at predetermined locations on the bottom surface of said tread portions, said standoffs having first fastener means associated therewith, and further including a plurality of elongated tubes having second fastening means associated with one end thereof, said second fastener means being adapted to engage said first fastener means such that said tubes form legs for supporting said pet ramp assembly, whereby said pet ramp assembly can alternatively be used as a grooming table.

13. A ramp assembly as recited in claim 12 and further including a plurality of coupling bars which when attached to said standoffs enable at least two of said ramp assemblies to be attached in tandem to form a doublewide grooming table.

14. A ramp assembly as recited in claim 1 and further including a plurality of standoffs integrally formed at predetermined locations on the bottom surface of said tread portions, said standoffs having first fastener means associated therewith, and further including a plurality of rollers having second fastener means associated therewith, said second fastener means being adapted to engage said first fastener means such that said rollers form legs for supporting said pet ramp assembly, whereby said pet ramp assembly can alternatively be used as a transport platform.

15. A ramp assembly as recited in claim 14 and further including generally U-shaped handle means having second fastening means at one extremity thereof for matingly engaging said first fastening means to facilitate towing of said transport platform.

16. A ramp assembly as recited in claim 1 wherein at least one of said lateral sidewalls has a notch provided in an edge thereof midway along the length of the associated ramp component so that a gripping opening is formed for facilitating carriage of said assembly when it is in said folded configuration.

17. A ramp assembly as recited in claim 16 wherein an irregular surface is provided on the inside surface of the sidewall adjacent said notch when said assembly is in its folded configuration, said irregular surface being adapted to accommodate the fingers of a person carrying the assembly.

18. A ramp assembly as recited in claim 1 and further including a plurality of standoffs integrally formed at predetermined locations on the bottom surface of said tread portions, said standoffs having first fastener means associated therewith, and further including a float means having second fastener means associated therewith, said second fastener means being adapted to engage said first fastener means such that said float means may be used to floatingly support at least one end of said pet ramp assembly in water, whereby said pet ramp assembly can alternatively be used as a floating platform or water ingress/egress means.

19. A ramp assembly as recited in claim 12 and further comprising:
   a ramp carrier including
      a support bracket adapted for attachment to a vehicle at a position thereon such that said ramp assembly can be used for ingress/egress, and
      carriage means pivotally affixed to said support bracket and having engagement means adapted to engage at least some of said standoffs such that said ramp assembly may be carried by the vehicle, said engagement means being adapted to allow said ramp assembly to be retracted to its folded configuration and deployed at will to its extended configuration.

20. A ramp assembly as recited in claim 19 wherein said support bracket includes an L-shaped means having a horizontally extending leg adapted to engage a trailer hitch tube and a vertically extending leg;

wherein said carriage means includes an a downwardly opening tube for telescopically engaging said vertically extending leg, and a horizontally extending arm affixed to said downwardly opening tube, and wherein said engagement means is pivotally connected to said horizontally extending arm and allows said ramp assembly to rotate about a horizontal axis.

21. A ramp assembly as recited in claim 19 wherein said horizontally extending arm is rotatable relative to said downwardly opening tube so that said ramp assembly may be rotated between a position substantially parallel to an adjacent vehicle side and a position substantially normal to the vehicle side.

22. An assembly comprising:

a first molded component including an elongated generally rectangular and planar first support portion having its lateral extremities folded up, out and then down to form upstanding side rails and downwardly extending lateral side walls, a first end portion at one end of said first support portion, a second end portion at an opposite end of said first support portion having a first plurality of apertured flanges extending therefrom to form a first hinge set, and means forming at least one integrally molded box-beam disposed beneath and extending along substantially the entire length of said first support portion;

a second molded component including an elongated generally rectangular and planar second support portion having its lateral extremities folded up, out and then down to form upstanding side rails and downwardly extending lateral side walls, a first end portion at one end of said second support portion having a second plurality of apertured flanges extending therefrom to form a second hinge set, a second end portion at an opposite end of said second support portion, and means forming at least one integrally molded box-beam disposed beneath and extending along substantially the entire length of said second support portion; and at least one pivot pin adapted to extend through the apertures in said first and second hinge sets so as to pivotally join said first molded component to said second molded component, wherein said first and second molded components may be rotated about said pivot pin between a folded configuration with said first and second molded components lying in parallel side-by-side relationship, and an extended configuration wherein said first and second molded components lie within a common plane and said assembly forms a load bearing structure that can be used in a horizontal or inclined disposition.

23. An assembly as recited in claim 22 and further comprising means for locking said first and second molded components in at least one of said first and second configurations.

24. An assembly as recited in claim 23 wherein said means for locking includes a keeper affixed to said first end portion of said first molded component and a latch affixed to said second end portion of said second molded component, whereby when said first and second molded components are in said folded configuration, said latch can engage said keeper to lock said components together.

25. An assembly as recited in claim 22 and further comprising:

a carrier including a support bracket adapted for attachment to a vehicle at a position thereon such that said assembly can be used for ingress/egress, and carriage means pivotally affixed to said support bracket and having engagement means adapted to engage standoffs molded to the bottom surfaces of said first and second tread portions such that said assembly may be carried by the vehicle, said engagement means being adapted to allow said assembly to be retracted to its folded configuration and deployed at will to its extended configuration.

26. An assembly as recited in claim 25 wherein said support bracket includes an L-shaped means having a horizontally extending leg adapted to engage a trailer hitch tube and a vertically extending leg;

wherein said carriage means includes an a downwardly opening tube for telescopically engaging said vertically extending leg, and a horizontally extending arm affixed to said downwardly opening tube, and wherein said engagement means is pivotally connected to said horizontally extending arm and allows said assembly to rotate about a horizontal axis.

27. An assembly as recited in claim 26 wherein said horizontally extending arm is rotatable relative to said downwardly opening tube so that said assembly may be rotated between a position substantially parallel to an adjacent vehicle side and a position substantially normal to the vehicle side.

* * * * *

UNITED STATES PATENT AND TRADEMARK OFFICE
CERTIFICATE OF CORRECTION

PATENT NO. : 6,725,487 B2
DATED : April 27, 2004
INVENTOR(S) : Kenneth W. Myrick et al.

It is certified that error appears in the above-identified patent and that said Letters Patent is hereby corrected as shown below:

Title page,
Item [76], Inventors, should read -- Kenneth W. Myrick, 485 Palo Alto Avenue, Mountain View, CA (US) 94041 --.

Signed and Sealed this

Tenth Day of August, 2004

JON W. DUDAS
*Acting Director of the United States Patent and Trademark Office*